UNITED STATES PATENT OFFICE.

HARRY N. THOMSON AND FREDERICK LAIST, OF ANACONDA, MONTANA.

PROCESS OF TREATING SLIMES.

No. 832,176.  Specification of Letters Patent.  Patented Oct. 2, 1906.

Application filed March 19, 1906. Serial No. 306,911.

*To all whom it may concern:*

Be it known that we, HARRY N. THOMSON and FREDERICK LAIST, citizens of the United States, residing at Anaconda, in the county of Deerlodge and State of Montana, have invented certain new and useful Improvements in Processes of Treating Slimes, of which the following is a specification.

Our invention has relation to improvements in processes of treating slimes of sulfid ores of copper, (with or without an admixture of silver;) and it consists in the novel series of steps more fully set forth in the specification and pointed out in the claims.
The object of our invention is to effect the recovery of the metal from copper-sulfid ores (having an essentially silicious gangue) on a commercially economic basis, the process bringing into requisition chemical reagents which may be cheaply produced or whose cost is but nominal or which are evolved as by-products in the course of subjecting sulfid ores to roasting operations.

A further object is to subject such slimes to a series of successive treatments which will result in the production of a minimum quantity of by-products and which are accompanied by a minimum amount of waste.

The advantages of the process will be better apparent from a detailed description of the invention, which is as follows:

The slimes here treated are those derived from ore-dressing apparatus operating on crushed sulfid ores not previously roasted.
These slimes, which in the case of copper ores carry more or less silver and some iron, (all the metals being in the form of sulfids,) are under our process first dried to thoroughly expel the water, then subsequently disintegrated, after which they are roasted at a barely dull-red heat, these series of steps being all accomplished in any available forms of apparatus and furnaces known to the art and familiar to the skilled metallurgist. The roasting at a low heat (dull red) is an important consideration, since high temperatures, or temperatures above dull red, tend to render the copper insoluble for the subsequent stages of the process. The slimes before the roasting operation may be considered as a mixture of copper, silver, and iron sulfids, expressed by the chemical formulæ, $Cu_2S$, $FeS_2$, $Ag_2S$. During the roasting operation a portion of the sulfur is oxidized, passing off in the form of sulfur dioxid, ($SO_2$,) and another portion of the sulfids are converted into sulfates according to the following reactions:

$Cu_2S + 2FeS_2 + 15O = 2CuO + Fe_2O_3 + 5SO_2$.

$Cu_2S + FeS_2 + 12O = 2CuSO_4 + FeSO_4$.

$Ag_2S + 3O = Ag_2O + SO_2$.

$Ag_2S + O_4 = Ag_2SO_4$.

The roasted slimes (containing, as above indicated, variable mixtures of the oxids and sulfates of copper, iron, and silver) are agitated for a period of from one to two hours in a solution comprising a mixture of sulfuric acid, ferrous sulfate, and sodium chlorid, the proportions of this mixture being from two to six parts, by weight, of sulfuric acid, from five to twenty-five parts, by weight, of ferrous sulfate, and from five to twenty-five parts, by weight, of sodium chlorid. The agitation should continue preferably at a temperate heat (though ranging between 10° to 100° centigrade) and for a time sufficient to effect the conversion of all the copper oxid into soluble sulfate by the action of the sulfuric acid, the sodium chlorid (which should always be in sufficient quantities for the purpose) acting as a solvent for the silver constituents, (oxid and sulfate,) as will be readily apparent from the following reactions:

$CuO + H_2SO_4 = CuSO_4 + H_2O$.

$2Ag_2O + Ag_2SO_4 + 12NaCl + 2H_2SO_4 =$
$6AgCl.NaCl + 3Na_2SO_4 + 2H_2O$.

We need not concern ourselves about the ferric-oxid constituent, as it is not of sufficient importance to be considered as an element, there being no occasion for its recovery and it not interfering in any wise with the subsequent steps of the process. Eliminating from consideration the ferric oxid, ($Fe_2O_3$,) the products resulting from the agitation of the roasted slimes in the mixture of sulfuric acid, ferrous sulfate, and sodium chlorid are in substance (as seen from the foregoing reactions) a mixture of the solutions of copper sulfate and silver chlorid, together with ferrous sulfate, ferrous chlorid, sodium sulfate, and water and perhaps an excess of sodium chlorid and sulfuric acid. To facilitate the solution of the copper during the agitation aforesaid, air and gases ($SO_2$) from roasting-furnaces are passed through the solution.

It may be stated in passing that the sodium-chlorid constituent of the mixture not only acts as a solvent for the silver, but tends to increase the solvent action of the solution for copper. The iron-sulfate constituent tends to dissolve any copper sulfid which may have escaped oxidation in the roaster.

Upon the conclusion of the operation as above outlined the liquor is filtered either in a filter-press or any available form of vacuum-filter. The tailings after being washed with a weak solution (of like composition) and water are sluiced or hauled to the dump, while the solution is mixed with the filtrate and the mixed solutions subjected to the action of sulfureted-hydrogen gas. The sulfureted hydrogen reacts with the copper sulfate, producing insoluble copper sulfid and free sulfuric acid in the solution, as shown by the following reaction:

$$CuSO_4 + H_2S = CuS + H_2SO_4.$$

So far as any silver may be present this will likewise be precipitated in the form of insoluble sulfid according to the following reactions:

$$2AgCl.NaCl + H_2S = Ag_2S + 2NaCl + 2HCl.$$

The precipitated copper sulfid (mixed more or less with silver sulfid) is filter-pressed, washed, and subsequently smelted to metallic copper by any well-known reduction process. The filtrate of sulfuric acid may be brought up to proper strength by the addition of other sulfuric acid to be used for leaching a fresh charge of slimes in the manner heretofore set out and pointed out in the description.

The source of the sulfureted hydrogen for effecting the precipitation of the copper is immaterial, but we prefer to generate the same by treating a low-grade matte with sulfuric acid. The matte is to be made by fusing an iron-pyrite ($FeS_2$) ore in a reverberatory furnace with the addition of suitable fluxes, if necessary. The pyritous ore to be used may contain some copper; but it is desirable to have the matte run low in copper, since a high precentage of the latter retards the action of the acids. The product of the fusion may be expressed by the following reaction:

$$FeS_2 \text{ (fused)} = FeS + S.$$

The FeS treated with sulfuric acid produces the sulfureted hydrogen, thus:

$$FeS + H_2SO_4 = FeSO_4 + H_2S.$$

The mixture of copper sulfid, undecomposed iron sulfid, matte, &c., is to be remelted and blown up to copper in the converters.

The sulfuric acid for the process is preferably made from roasting-furnace gases by any of the standard processes.

Having described our invention, what we claim is—

1. In the treatment of slimes of metallic ores, the process of roasting the slimes, then subjecting the same to the action of acids and salts mixed in suitable proportions to effect solution of both the roasted and unoxidized portions of the ore, simultaneously passing roasting-furnace gases through the mass, then separating the solution, and subjecting it to the action of sulfureted hydrogen and recovering the resulting metal sulfids, substantially as set forth.

2. In the treatment of slimes of metallic ores, the process of drying and disintegrating the slimes, then roasting the same at a dull-red heat, then subjecting the roasted product to the action of a mixture of sulfuric acid, iron sulfate and sodium chlorid and simultaneously passing through the mass roasting-furnace gases in the form of air mixed with sulfur dioxid to effect the solution of the metal compounds of the roasted product, then filtering the same, then subjecting the filtrate to the action of sulfureted hydrogen and recovering the resulting sulfids, substantially as set forth.

3. In the treatment of slimes of metallic ores, the process of drying and disintegrating the slimes, then roasting the same at a dull-red heat, then subjecting the roasted product to the action of a mixture of sulfuric acid, iron sulfate and sodium chlorid and simultaneously passing air and sulfur-dioxid gas through the mass to effect solution of the metal compounds, then filtering the same, washing the tailings or residue and combining the filtrate with the wash-waters, then passing sulfureted hydrogen through the solution, and finally recovering and smelting the metal sulfids, substantially as set forth.

4. In the treatment of slimes of copper ores, the process of roasting the slimes, subjecting the roasted product to the action of acids and salt solutions impregnated with sulfur dioxid, to effect solution of the metal of the ore, filtering the same, subjecting the filtrate to the action of sulfureted hydrogen, removing the resulting precipitate of copper sulfid, filter-pressing, washing, and finally smelting the same to metallic copper, substantially as set forth.

In testimony whereof we affix our signatures in presence of two witnesses.

HARRY N. THOMSON.
FREDERICK LAIST.

Witnesses:
H. R. BURG,
M. MARTIN.